United States Patent [19]

Currie

[11] 4,138,374

[45] Feb. 6, 1979

[54] PROCESS FOR MANUFACTURING SHAPED POLYESTER ARTICLE USING SCRAP MATERIALS

[75] Inventor: Robert M. Currie, Circleville, Ohio

[73] Assignee: E. I. Du Pont de Nemours and Company, Wilmington, Del.

[21] Appl. No.: 875,101

[22] Filed: Feb. 3, 1978

[51] Int. Cl.$^2$ ............................................. C08L 67/02
[52] U.S. Cl. ..................................... 260/2.3; 528/273
[58] Field of Search ............... 260/75 M, 2.3; 528/273

[56] References Cited

U.S. PATENT DOCUMENTS

| | | | |
|---|---|---|---|
| 3,057,702 | 10/1962 | Caley et al. | 260/2 R |
| 3,248,180 | 4/1966 | Kilpatrick | 260/75 M |
| 3,257,335 | 6/1966 | Whitfield et al. | 260/2.3 |
| 3,652,466 | 3/1972 | Hittel et al. | 260/2.3 |

*Primary Examiner*—M. J. Welsh

[57] ABSTRACT

An improved process is disclosed for manufacturing a shaped article of polyester material wherein scrap polyester is blended with fully polymerized virgin polyester at reduced pressure.

15 Claims, No Drawings

PROCESS FOR MANUFACTURING SHAPED POLYESTER ARTICLE USING SCRAP MATERIALS

DESCRIPTION

Technical Field

This invention relates to a continuous process for manufacturing a shaped article of polyester material. The polyester material is a combination of virgin polyester and scrap polyester. The virgin polyester and the scrap polyester are blended in the polyester polymerization process at a point and in a manner to: assure complete combination of the components; reduce degradation and discoloration; avoid detrimental side reactions; improve the quality of shaped articles made using the polyester material; and increase the capacity of the polyester manufacturing facility.

BACKGROUND ART

In continuous polycondensation processes for manufacture of high molecular weight polyester materials, the reactants are generally polymerized in a closed stream under conditions of elevated temperature and reduced pressure. The final step in such polycondensation processes is conducted in a reaction vessel, hereinafter termed a "polymerization finisher" wherein a stream of low viscosity, low molecular weight polyester prepolymer is introduced into one end and, under conditions of elevated temperature and reduced pressure, the stream is removed from the other end as a high viscosity high molecular weight polyester. A polymerization finisher is generally a cylindrical vessel having its longitudinal axis disposed in a substantially horizontal plane and having an inlet for low molecular weight liquid at one end, an outlet for high molecular weight liquid at the other end, and at least one outlet for maintaining reduced pressure in the vessel and withdrawing water and other vaporous by-products from the vessel. Examples of polymerization finishers are disclosed in U.S. Pat. Nos. 3,248,180 and 3,057,702. Polymerization finishers are generally fitted with means for agitating the liquid during the course of the liquid through the finisher; and the outlet for high molecular weight liquid is generally downstream from the agitating means in a pool reservoir for the high molecular weight liquid.

It is well known that processes for manufacturing shaped articles from high molecular weight polyesters result in a large amount of scrap which scrap must be disposed of by some means. For economic reasons, the most satisfactory means for disposing of scrap polyester material is to reuse the material by returning it or its components to the stream of the polyester manufacturing process.

Scrap has been introduced to the stream by being dissolved in one of the monomers upstream from the finisher and before polymerization of the prepolymer has been started. In U.S. Pat. No. 2,933,476 issued Apr. 19, 1960, it is disclosed to add flaked scrap polyethylene terephthalate to the monomer stream in an amount which may be from ten to thirty percent of the total polymer product. Scrap has also been added to the stream by being dissolved in the prepolymer stream at the entrance of the polymerization finisher. Such early addition of polyethylene terephthalate film does permit recycle utilization of scrap material but tends to cause upsets in the process by virtue of the addition of fully polymerized material to monomer or prepolymer streams. Such early addition causes decrease in demand from the monomer supply units. Moreover, additional power is required for early addition of scrap, first to dissolve, and then to move, the polymer-containing stream of increased viscosity.

Scrap has been introduced to the stream by being glycolyzed to break the scrap into monomer and oligomer for repolymerization. In U.S. Pat. No. 3,257,335 issued June 21, 1966, it is disclosed to depolymerize polyester materials and to add the depolymerized material to a polyester manufacturing stream. Such depolymerization provides means for recycling scrap polyester material without appreciable increase in the viscosity of reactant streams; but additional power is required to dissolve, depolymerize, and repolymerize the scrap material. Additionally, scrap recycle by depolymerization causes decrease in demand from the monomer supply and does not provide any increase in the capacity of polymerization equipment. Scrap depolymerized by glycolysis results in formation of ethers, such as diethylene glycol, which ethers become incorporated as ether-linkages in polyester made from the scrap. Polyesters with such ether-linkages present, exhibit undesirable properties as do products made from such polyesters.

Scrap has also been introduced into the polymer stream by melting the scrap and blending it with completely polymerized virgin polymer. U.S. Pat. No. 3,652,466, issued Mar. 28, 1972; Defensive Publication T 870,010, published Jan. 13, 1970; and British Patent No. 1,358,342, published July 3, 1974, all relate to reclaiming polyester by comminuting polyester scrap in accordance with various methods. Each reference discloses that the comminuted scrap can then be blended with completely polymerized virgin polyester material. British Patent No. 1,264,338, published Feb. 23, 1972 discloses that scrap polyester material can be refed along with fresh polyester to a film forming extruder. Such blending of molten scrap polyester with molten virgin polyester requires a separate blending step independent of the polyester polymerization process. Such blending of materials is generally conducted under atmospheric or superatmospheric pressures without occasion for release of dissolved or occluded gases from the scrap material.

DISCLOSURE OF THE INVENTION

This invention involves a continuous process for manufacturing a shaped article of polyester material by extruding a molten blend of scrap polyester and virgin polyester. In this invention, the process for blending scrap polyester and virgin polyester is conducted as a final step in the polyester polymerization process.

Accordingly, there is provided a continuous process for manufacturing a shaped article of polyester material comprising the steps of: continuously polymerizing polyester in a closed, flowing, steady state polymerizing stream by a polycondensation reaction comprising adding low viscosity, low molecular weight polyester prepolymer to the beginning of the stream, maintaining conditions in the stream at elevated temperature and reduced pressure, and removing water and other polycondensation by-products from the stream to yield high viscosity, high molecular weight virgin polyester at the end of the stream; adding scrap polyester to the virgin polyester at the end of the stream to yield polyester material blend; withdrawing polyester material blend from the polymerizing stream; and forcing the polyester material blend through an extrusion die.

More specifically, there is provided a continuous process for manufacting a shaped article of polyester material comprising the steps of: continuously operating a polymerization finisher to manufacture high viscosity, high molecular weight virgin polyester; adding scrap polyester to the virgin polyester in the finisher to yield polyester material blend; withdrawing polyester material blend from the finisher; and forcing the polyester material blend through an extrusion die.

In its preferred form the process of this invention relates to manufacturing a polyester film web and includes additional steps of trimming scrap polyester from the film web, once extruded, and transporting the scrap polyester back to the point where the scrap polyester is added to the virgin polyester.

Polyester material blend forced through an extrusion die yields a shaped article whether the shaped article is cast film, fiber, or ribbon and whether it is later stretched or chopped into flakes or pellets.

Polyesters and polyester material as used herein, mean the linear polycondensation product of an aromatic dicarboxylic acid and a dihydric alcohol. Prepolymer as used herein, means a low molecular weight polymer of such acid and alcohol. Aromatic dicarboxylic acids include terephthalic acid, isophthalic acid, 4,4'-diphenyl-dicarboxylic acid, 2,6-naphthalenedicarboxylic acid, and the like. Dihydric alcohols include, lower alkane diols with from 2-10 carbon atoms, including ethylene glycol, propylene glycol, butylene glycol, cyclohexanedimethanol, and the like. The preferred polyesters are polyethylene terephthalate, polybutylene terephthalate, and poly(1,4-cyclohexanedimethylene terephthalate) or copolymers thereof which are manufactured in a process utilizing a polymerization finisher. Polyethylene terephthalate will be used hereinafter as an exemplary polyester for purposes of discussing the invention.

The low viscosity, low molecular weight polyester prepolymer added to the inlet end of the finisher is made by condensing dihydroxyethyl terephthalate obtained from an ester exchange reaction between dimethyl terephthalate and ethylene glycol or obtained from glycolysis of completely polymerized polyester. Such condensation is discussed in U.S. Pat. No. 2,465,319. The prepolymer is usually made to exhibit an intrinsic viscosity of about 0.1 to 0.4 which is believed to correspond to a molecular of about 1000 to 8000. Intrinsic viscosity is determined in a solvent of 40:60, by weight, mixture of phenol and tetrachloroethane at 30° C. with a polyester concentration in grams per 100 cubic centimeters of solution, as described in U.S. Pat. No. 2,727,882. The intrinsic viscosity and the molecular weight of polyester increase as the water and other glycol condensation by-products are removed and the polyester proceeds through the finisher. At the end of the finisher, the completely polymerized polyester exhibits an intrinsic viscosity of about 0.5 to 1.2 which is believed to correspond to a molecular weight of about 10,000 to 40,000. The completely polymerized polyester product of the reaction in the finisher will hereinafter be termed virgin polyester.

The residence time of the polyermizing material in the finisher of a polyester manufacturing process is from about 2 to 4 or 5 hours; and the scrap is added to the finisher so near to the outlet end that the residence time for the scrap in the finisher is only about 5 to 10 or 15 minutes. Finishers usually have a pool or reservoir volume of relatively low agitation at the end into which completely polymerized virgin polyester flows. By the process of this invention, scrap polyester is introduced into the finisher in the vicinity of the pool. It is preferred that the scrap polyester is added to the virgin polyester at substantially the same point in the finisher along the stream as the polyester material blend is withdrawn.

Degradation and discoloration of polyester materials is significantly increased by exposure to elevated temperatures. In the case of polyethylene terephthalate, the temperature of the stream of material in the finisher is from about 260°-300° C. for prepolymer at the inlet end to about 280°-310° C. for virgin polymer at the outlet end; — the temperature of the polyester being a function of the vapor pressure of the material undergoing polycondensation. While the elevated temperature in the finisher is important to completion of the polymerization, once the polymerization is completed, the elevated temperature only serves to promote degradation during transfer of the polyester from the finisher. It has been found difficult, in the past, to cool polyester by conventional heat exchange methods, at the end of the finisher, to decrease degradation. By adding the scrap polyester to the outlet end of the finisher at a temperature which is less than the temperature of virgin polymer at that point, the virgin polymer is cooled; and, to the extent of that cooling, the tendency for degradation is removed. Scrap polyester is generally added to the finisher in molten form at a temperature adequate to provide material which will flow and mix readily with the virgin polyester. Scrap polyester is generally added at a temperature of about 270° C. — about 20C. ° below the temperature of virgin polyester at conclusion of the polymerization. A temperature difference of as little as 2C. ° may yield significant improvement and a temperature difference of as much as 50C. ° is possible; — the temperature of polyester material at the end of the finisher being the weighted average of the temperature of the scrap polyester and the virgin polyester. The process of this invention reduces the tendency for degradation and discoloration of the polyester material by providing a means to cool the polyester material prior to its withdrawal from the finisher.

The degree of cooling to be realized by introduction of scrap polyester at a temperature of less than the temperature of the virgin polyester, is a function of the amount of scrap to be added to the finisher. Benefits of the invention are realized whenever scrap polyester is recycled. That is to say, practice of the invention has no lower limit for the amount of scrap polyester to be used. It can be said that the process is usually run with a scrap recycle rate wherein about 20 to 50 weight percent of the polyester material blend is scrap. It is possible, however, to shut the supply of virgin polyester off completely and operate with scrap polyester alone, such as in a case where repairs must be made in the polymerizing equipment and it is desired to maintain polymer flow through the extrusion die. The amount of scrap polyester which is added to the finisher is easily and quickly controlled and can be rapidly adjusted to accommodate changes in the supply of virgin polyester to maintain a constant supply of polyester material blend. Scrap polyester can be supplied directly from a shaped article manufacturing line and the scrap can be held in storage or holding bins until it is required for use in the process of this invention.

The capacity of a finisher is limited by residence time required for prepolymer in the finisher at polymerization conditions. In a polymerizing system operating at capacity, introduction of scrap upstream from the finisher, or even upstream in the finisher, itself, reduces residence time for prepolymer. In practice of the process of the present invention, residence time of prepolymer is not altered and the capacity of the polymerizing system is directly increased by the amount of scrap polyester added to the virgin polyester. A finisher operating at full capacity can produce 50 percent more polyester material by adding scrap polyester in the amount of 50 percent of the original capacity.

By introducing the scrap polyester into the end of the finisher in accordance with the process of this invention, the scrap polyester is subjected to a reduced pressure of a degree adequate to cause trapped gases to escape from the scrap polyester. Without such exposure to reduced pressure, gases in the scrap polyester would be passed on to the shaped article, when made, and could cause deterioration or breakage of the article. For example, in the manufacture of polyester films, the presence of such gases would cause holes in the film and might cause a rupture in the film web.

Complete blending of scrap polyester with virgin polyester is necessary to obtain a uniform polyester product. Addition of scrap polyester to virgin polyester at the end of the finisher provides adequate agitation to afford complete blending without a separate process step.

As previously stated, it has been found that recycling scrap polyester by glycolyzing the material for addition to a monomer stream generates ethers which become incorporated into the polyester and alter the properties of the polyester material and products made from the polyester material. The process of this invention does not include glycolysis and does not, therefore, generate ethers.

Scrap polyester is obtained from any source of material and the scrap need not necessarily have been previously used. Scrap can be obtained from any shaped polyester article. Fiber or film from recycled products can be used. The usual and preferred source of scrap polyester is waste material from fiber or film manufacturing processes. For example, in polyester film manufacture, there may be as much as fifty percent scrap due to start up waste and edge and slitting trim. Such waste and trim material can often be used even if the material has had surface treatments or includes fillers or coatings. The only consideration in using such treated, filled, or coated scrap polyester is that the treated polyester or the filler or coating material must not be present in such amount that it would adversely affect finished product quality.

Waste and trim material from manufacturing processes is often immediately recycled directly into the polymerization stream and such practice is preferred. Waste, such as polyethylene terephthalate edge trim from a film making process, is shredded to flake form and, if desired, compacted by conventional means to form pellets. For best results, the flakes or pellets are dried and then can be melted and extruded at any desired or required rate into the finisher in accordance with this invention. It is preferred to dry the scrap polyester to water content of less than about 0.05 weight percent. As has been previously disclosed in U.S. Pat. No. 2,503,251, polyester flake should be dried before being mixed at any point into the polyester polymerizing system. Such drying reduces degradation of the polyester in later handling steps. With the exception that the scrap polyester is added at the end of the finisher, other elements of the recycling process are conventional.

To obtain all of the benefits hereinabove described and attributed to the process of this invention, as pointed out, scrap polyester must be added to the polyester polymerizing system at the outlet end of the polymerizing finisher. Polymerizing finishers represent the heart of extremely complex polyester polymerizing processes; and, for successful operation of polymerizing finishers, material streams and process conditions must be delicately controlled. A most surprising aspect of the present invention is that scrap polyester can be added to virgin polyester at the end of the finisher without upsetting the control and operation of the finisher.

BEST MODE

As an example of preferred practice of the process of this invention, direct recycle of scrap polyester from polyethylene terephthalate film manufacture is described. Polyethylene terephthalate prepolymer is made from about 70 weight percent dihydroxyethyl terephthalate and 30 weight percent glycolyzed polyethylene terephthalate. The prepolymer is continuously introduced into the finisher and is conducted through the finisher with removal of water and ethylene glycol polycondensation by-products and through the film extrusion die to manufacture polyethylene terephthalate film. The film web edges are trimmed and the trimmed scrap polyester is comminuted to flakes, compacted to pellets, dried from an initial water content of from about 0.1 to 0.4 weight percent to a final water content of from about 0.01 to 0.04 weight percent. The pelletized and dried scrap polyester flake is conducted to and through a melter-extruder of conventional design and through the wall at the end of the finisher over the pool of virgin polyester. Scrap polyester is added to the finisher and, to maintain a constant production rate, input of prepolymer to the finisher is reduced. Addition of scrap polyester is increased until about 20 weight percent of the extruded polyethlyene terephthalate film product is recycled scrap polyester. Tests of physical qualities of the film product with increasing scrap polyester content, indicate no detectable difference between film made wholly from virgin polyester and film made from a blend of virgin polyester and scrap polyester. Tests included comparative determinations of qualities such as intrinsic viscosity, color, gel content, dimensional stability and tensile strength. In the above examples, when scrap polyester is added at the finisher pool and the prepolymer supply is decreased an amount corresponding to the scrap added, the pressure at which the polymerization finisher can operate is increased by as much as one millimeter of mercury. Because the rate of polymerization is a function of the pressure in the finisher, this increase in pressure indicates a potential increase in capacity. Additional prepolymer can be introduced into the finisher to require the pressure to be reduced to the pressure which was necessary before adding scrap polyester.

Similar results would be found when the scrap polyester is added without decreasing prepolymer input to achieve increased production rate.

I claim:

1. A process for manufacturing a shaped article of polyester material comprising the steps of:

(a) continuously polymerizing polyester in a closed, flowing, steady state polymerizing stream by a polycondensation reaction comprising
  (i) adding low viscosity, low molecular weight polyester prepolymer to the beginning of the stream,
  (ii) maintaining conditions in the stream at elevated temperature and reduced pressure, and
  (iii) removing water and other polycondensation by-products from the stream, to yield high viscosity, high molecular weight virgin polyester at the end of the stream;
(b) adding scrap polyester to the virgin polyester at the end of the stream to yield polyester material blend;
(c) withdrawing polyester material blend from the polymerizing stream; and
(d) forcing the polyester material blend through an extrusion die.

2. The process of claim 1 wherein the scrap polyester is added to the virgin polyester at substantially the same point along the stream as the polyester material blend is withdrawn.

3. The process of claim 1 wherein the temperature of the scrap polyester as it is being added to the virgin polyester is less than the temperature of the virgin polyester.

4. The process of claims 1 or 3 wherein the temperature of the virgin polyester is from about 280 to 310 degrees Celsius before scrap polyester is added thereto.

5. The process of claim 1 wherein the shaped article is a polyester film web and wherein there are the added steps of
(e) trimming scrap polyester from the film web;
(f) transporting the scrap polyester back to the end of the stream;
to be used in step (b).

6. The process of claims 1 or 5 wherein the scrap polyester is dried to a water content of less than 0.05 weight percent of water before step (b).

7. The process of claim 1 wherein the polyester material is polyethylene terephthalate.

8. A process for manufacturing a shaped article of polyester material comprising the steps of:
(a) continuously operating a polymerization finisher to manufacture high viscosity, high molecular weight virgin polyester;
(b) adding scrap polyester to the virgin polyester in the finisher to yield polyester material blend;
(c) withdrawing polyester material blend from the finisher; and
(d) forcing the polyester material blend through an extrusion die.

9. The process of claim 8 wherein the scrap polyester is added to the virgin polyester at substantially the same point along the finisher as the polyester material blend is withdrawn.

10. The process of claim 9 wherein the temperature of the scrap polyester as it is being added to the virgin polyester is less than the temperature of the virgin polyester.

11. The process of claims 8 or 10 wherein the temperature of the virgin polyester is from about 280 to 310 degrees Celsius before scrap polyester is added thereto.

12. The process of claim 8 wherein the shaped article in a polyester film web and wherein there are the added steps of
(e) trimming scrap polyester from the film web;
(f) transporting the scrap polyester back to the finisher;
to be used in step (b).

13. The process of claims 8 or 12 wherein the scrap polyester is dried to a water content of less than 0.05 weight percent of water before step (b).

14. The process of claim 8 wherein the polyester material is polyethylene terephthalate.

15. The process of claims 3 or 10 wherein the temperature of the scrap polyester is from 2 to 50 Celsius degrees less than the temperature of the virgin polyester.